(12) United States Patent
El Hajj et al.

(10) Patent No.: US 12,069,581 B2
(45) Date of Patent: Aug. 20, 2024

(54) TIME AVERAGING FOR SPECIFIC ABSORPTION RATE AND POWER DENSITY

(71) Applicant: Intel Corporation, Santa Clara, CA (US)

(72) Inventors: Walid El Hajj, Antibes (FR); Manuel Blazquez De Pineda, Antibes (FR); Nawfal Asrih, Mandelieu-la-Napoule (FR); Mythili Hegde, Banglaore (IN); John Michael Roman, Hillsboro, OR (US); Robert Paxman, Hillsboro, OR (US); Zhen Yao, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 336 days.

(21) Appl. No.: 17/353,843

(22) Filed: Jun. 22, 2021

(65) Prior Publication Data

US 2022/0095237 A1     Mar. 24, 2022

(51) Int. Cl.
*H04W 52/08*     (2009.01)
*H04B 17/10*     (2015.01)
(Continued)

(52) U.S. Cl.
CPC ........ *H04W 52/143* (2013.01); *H04B 17/102* (2015.01); *H04W 28/18* (2013.01); *H04W 52/08* (2013.01)

(58) Field of Classification Search
CPC ... H04W 52/143; H04W 52/08; H04W 28/18; H04B 17/102
See application file for complete search history.

(56) References Cited

U.S. PATENT DOCUMENTS

| | | | |
|---|---|---|---|
| 7,251,290 B2 * | 7/2007 | Rashev | H03F 1/0277 327/140 |
| 8,207,887 B2 * | 6/2012 | Goldman | G01S 13/9029 342/159 |

(Continued)

FOREIGN PATENT DOCUMENTS

| | | | |
|---|---|---|---|
| EP | 3474609 A1 * | 4/2019 | .......... H04B 1/3838 |
| EP | 3474609 A1 | 4/2019 | |

(Continued)

OTHER PUBLICATIONS

European Search Report issued for the corresponding European patent application No. 21 19 1855, dated Feb. 7, 2022, 1 page (for informational purposes only).

*Primary Examiner* — Hai V Nguyen
(74) *Attorney, Agent, or Firm* — VIERING, JENTSCHURA & PARTNER MBB (57) ABSTRACT

A wireless communication device includes one or more processors, configured to determine one or more first transmission power measurements within a first transmission power measurement sampling period; calculate a first transmission power factor, the first transmission power factor representing a central tendency of the one or more first transmission power measurements from the first power measurement sampling period; determine a second power measurement during a second transmission power measurement sampling period; and calculate a second transmission power factor, wherein the second transmission power factor is a central tendency of at least one of the one or more first power measurements and the second power measurement.

18 Claims, 7 Drawing Sheets

(51) Int. Cl.
*H04W 28/18* (2009.01)
*H04W 52/14* (2009.01)

(56) References Cited

U.S. PATENT DOCUMENTS

| | | | | |
|---|---|---|---|---|
| 8,786,134 | B2* | 7/2014 | Kazama | H02J 7/00034 |
| | | | | 307/104 |
| 9,591,499 | B2* | 3/2017 | Comsa | H04W 72/541 |
| 9,692,260 | B2* | 6/2017 | Walsh | H02J 50/80 |
| 9,698,628 | B2* | 7/2017 | Cain | G06F 1/3203 |
| 9,948,414 | B2* | 4/2018 | Comsa | H04W 24/10 |
| 10,652,839 | B2* | 5/2020 | Park | H04W 52/146 |
| 10,924,146 | B2* | 2/2021 | Kaidar | H04B 1/3838 |
| 11,071,067 | B2* | 7/2021 | Park | H04W 52/146 |
| 11,412,523 | B2* | 8/2022 | Wigren | H04W 72/12 |
| 11,689,234 | B2* | 6/2023 | Kaidar | H04W 52/44 |
| | | | | 455/127.1 |
| 11,716,695 | B2* | 8/2023 | Curtiss | H04W 52/367 |
| | | | | 455/522 |
| 2007/0286267 | A1* | 12/2007 | Scott | G01R 21/01 |
| | | | | 375/224 |
| 2010/0321234 | A1* | 12/2010 | Goldman | G01S 13/9029 |
| | | | | 342/25 A |
| 2011/0006944 | A1* | 1/2011 | Goldman | G01S 13/9054 |
| | | | | 342/25 A |
| 2012/0281563 | A1* | 11/2012 | Comsa | H04W 24/10 |
| | | | | 370/252 |
| 2013/0154381 | A1* | 6/2013 | Cain | G06F 1/3203 |
| | | | | 307/104 |
| 2014/0103734 | A1* | 4/2014 | Walsh | G01R 1/20 |
| | | | | 307/104 |
| 2014/0252866 | A1* | 9/2014 | Walsh | H04B 5/00 |
| | | | | 307/104 |
| 2015/0216762 | A1* | 8/2015 | Oohashi | A61M 21/02 |
| | | | | 601/47 |
| 2017/0149514 | A1* | 5/2017 | Comsa | H04B 17/345 |
| 2018/0287650 | A1* | 10/2018 | Mercer | H04W 52/18 |
| 2018/0301936 | A1* | 10/2018 | Lee | H04B 5/79 |
| 2019/0124605 | A1* | 4/2019 | Park | H04W 52/367 |
| 2019/0253095 | A1* | 8/2019 | Mercer | H04W 52/18 |
| 2019/0349017 | A1* | 11/2019 | Kaidar | H04W 52/367 |
| 2020/0275387 | A1* | 8/2020 | Park | H04B 17/102 |
| 2021/0218432 | A1* | 7/2021 | Kaidar | H04W 52/44 |
| 2021/0337559 | A1* | 10/2021 | Wigren | H04W 52/223 |

FOREIGN PATENT DOCUMENTS

| | | | | |
|---|---|---|---|---|
| EP | 3567940 A1 * | 11/2019 | | H04B 1/3838 |
| EP | 3567940 A1 | 11/2019 | | |
| WO | 2015167508 A1 | 11/2015 | | |
| WO | WO-2015167508 A1 * | 11/2015 | | H04W 52/18 |

* cited by examiner

Determining a plurality of first transmission power measurements within a first transmission power measurement sampling period 902

Calculating a first transmission power factor, the first transmission power factor representing a central tendency of the plurality of first transmission power measurements from the first power measurement sampling period 904

Determining a second power measurement during a second transmission power measurement sampling period 906 calculating a second transmission power factor, wherein the second transmission power factor is a central tendency of at least one of the plurality of first power measurements and the second power measurement. 908

TIME AVERAGING FOR SPECIFIC ABSORPTION RATE AND POWER DENSITY

CROSS-REFERENCE TO RELATED APPLICATIONS

This application claims priority to Indian Patent Application 202041041295, filed on Sep. 23, 2020, the entirety of which is incorporated herein by reference.

TECHNICAL FIELD

Aspects of this disclosure relate to power management in electromagnetic transmissions.

BACKGROUND

Wireless communication devices may be required to operate within certain limitations for a maximum human exposure to electromagnetic fields. For example, various nations or legal jurisdictions may impose such limitations for devices that operate within their territories. This management of electromagnetic exposure for human safety may be known as human exposure compliance.

Human exposure compliance may conventionally be measured using specific absorption rate (SAR) or power density. SAR may generally be understood as a measure of the rate at which a unit mass of a human body absorbs energy when it is exposed to electromagnetic fields. Human exposure compliance may be managed by detecting when radiofrequency (RF) exposure exceeds certain predefined limits. In reaching a human exposure compliance calculation, the calculated SAR or power density is conventionally reduced by a process of "static power reduction" through the use of look-up tables. Devices typically use proximity sensors to detect the physical proximity of users to the antenna and power is reduced accordingly.

However, the implementation of proximity sensors is not optimal because static power reduction is relative to continuous operation at maximum output power; i.e., 100% of the time. This may be unrealistic, as this does not reflect most real-world implementations, and therefore calculations that assume continuous maximum power may result in unnecessary restrictions that may reduce data throughput performance and/or network capacity efficiency. Consequently, the approach of applying time-averaging in real-time to ensure RF exposure compliance is considered to provide more practical and realistic SAR or Power Density.

Although different procedures and averaging methods can be used for time averaged SAR, the most common procedure is to simply calculate an arithmetic mean (standard averaging).

Some state regulators (for example, Innovation, Science and Economic Development in Canada (ISED)) mandate this specific type of averaging in human exposure compliance calculations. Use of the arithmetic mean, however, is associated with at least two problems. First, the arithmetic mean is typically calculated using a large number of samples, and this requires a significant memory size to collect and store all of the samples during the averaging period. Second, calculation of the arithmetic mean results in an overshoot during the first cycle.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DETAILED DESCRIPTION

The following detailed description refers to the accompanying drawings that show, by way of illustration, specific details and aspects of embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The words "plurality" and "multiple" in the description or the claims expressly refer to a quantity greater than one. The terms "group (of)", "set [of]", "collection (of)", "series (of)", "sequence (of)", "grouping (of)", among others, and the like in the description or in the claims refer to a quantity equal to or greater than one, i.e. one or more. Any term expressed in plural form that does not expressly state "plurality" or "multiple" likewise refers to a quantity equal to or greater than one. The terms "proper subset", "reduced subset", and "lesser subset" refer to a subset of a set that is not equal to the set, i.e. a subset of a set that contains less elements than the set.

As used herein, "memory" are understood as a non-transitory computer-readable medium in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, among others, or any combination thereof. Furthermore, registers, shift registers, processor registers, data buffers, among others, are also embraced herein by the term memory.

The term "software" refers to any type of executable instruction, including firmware.

The term "terminal device" utilized herein refers to user-side devices (both portable and fixed) that can connect to a core network and/or external data networks via a radio access network. "Terminal device" can include any mobile or immobile wireless communication device, including User Equipments (UEs), Mobile Stations (MSs), Stations (STAs), cellular phones, tablets, laptops, personal computers, wearables, multimedia playback and other handheld or body-mounted electronic devices, consumer/home/office/commercial appliances, vehicles, and any other electronic device capable of user-side wireless communications.

The term "network access node" as utilized herein refers to a network-side device that provides a radio access network with which terminal devices can connect and exchange information with a core network and/or external data networks through the network access node. "Network access nodes" can include any type of base station or access point, including macro base stations, micro base stations, Home base stations, Remote Radio Heads (RRHs), relay points, Wi-Fi/WLAN Access Points (APs), Bluetooth master devices, DSRC RSUs, terminal devices acting as network access nodes, and any other electronic device capable of network-side wireless communications, including both immobile and mobile devices (e.g., vehicular network access nodes, moving cells, and other movable network access nodes). As used herein, a "cell" may be understood as a sector served by a network access node.

The term wireless communication device as used herein may include any of a terminal device and/or a network access node.

Unless explicitly specified, the term "transmit" encompasses both direct (point-to-point) and indirect transmission (via one or more intermediary points). Similarly, the term "receive" encompasses both direct and indirect reception. Furthermore, the terms "transmit", "receive", "communicate", and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception is handled by radio-layer components such as RF transceivers and antennas, and the logical transmission and reception over the software-level connection is performed by the processors or controllers. The term "communicate" encompasses one or both of transmitting and receiving, i.e. unidirectional or bidirectional communication in one or both of the incoming and outgoing directions. The term "calculate" encompass both 'direct' calculations via a mathematical expression/formula/relationship and 'indirect' calculations via lookup or hash tables and other array indexing or searching operations.

Figure 1:
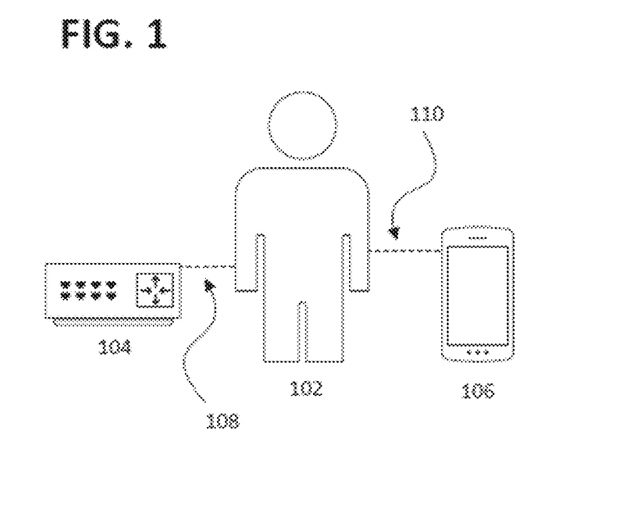
FIG. 1 depicts sensor-based human exposure compliance.
Figure 2:
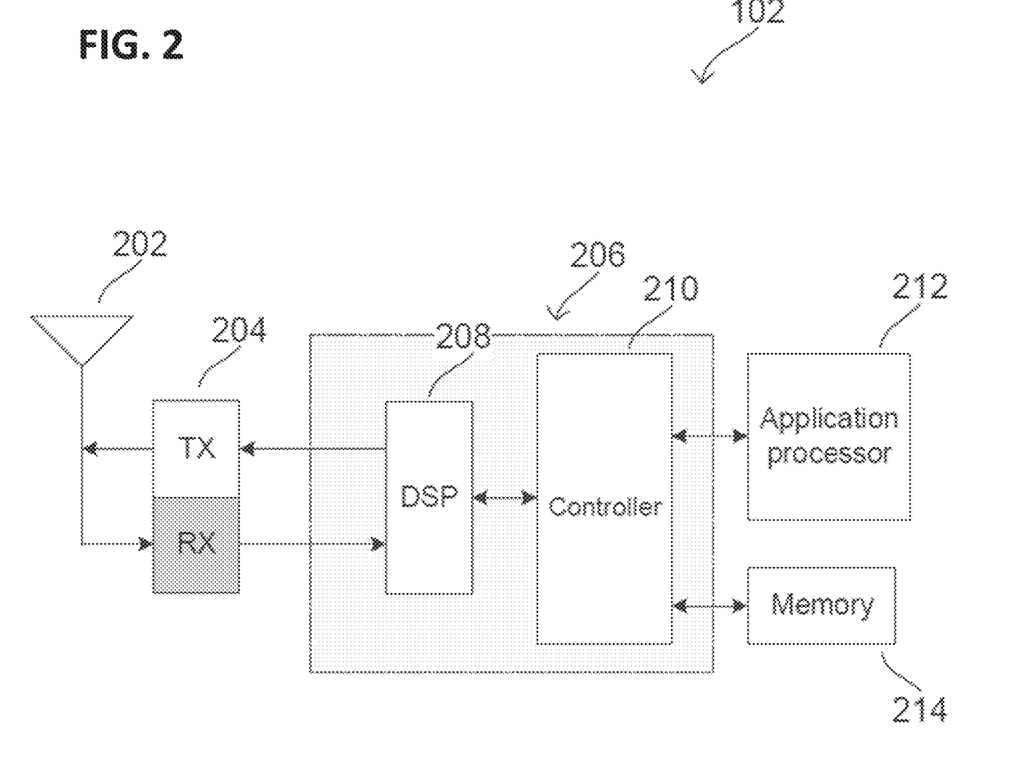
FIG. 2 shows an internal configuration of a wireless communication device.

The next section will be dedicated to a communication network and a terminal device, as depicted in FIG. 1 and FIG. 2, respectively.

FIG. 1 depicts sensor-based human exposure compliance according to an aspect of the disclosure. In this image, a human user 102 is located within a vicinity of a network access node (configured exemplary as a wireless router in this image, but could be any network access node configured to output a radiofrequency signal) 104 and a terminal device 106. Each of the network access node 104 and the terminal device 106 may include a proximity sensor (not shown), which may be configured to determine a proximity between the device (104 or 106) and the human user 102. The proximity sensor may operate according to any method or standard for detecting proximity, without limitation.

The wireless communication device 106 may be configured to employ one or more strategies to limit human exposure to electromagnetic fields. For example, the wireless communication device may be configured to ensure that the device's average emitted electromagnetic fields does not exceed a predetermined threshold. By limiting the emitted electromagnetic energy, human 102 in close proximity to the device 106 is exposed to less energy within the device's electromagnetic field. Otherwise stated, the device 106 may be configured to ensure that the average energy in the emitted electromagnetic fields is within a predetermined range. Should the average energy in the emitted electromagnetic fields reach or exceed an upper boundary of an acceptable range, the wireless communication device 106 may reduce its power (e.g. instantaneous power, power density) of its wireless transmission. Although this procedure is described relative to the device 106, the network access node 104 may also perform a similar or identical function to limit human exposure to its electromagnetic energy.

Devices 104 and 106 may be configured to wirelessly transmit over a radio access network. The radio access network may include, but is not limited to, LTE, UMTS, GSM, other 3rd Generation Partnership Project (3GPP) networks, WLAN/WiFi, Bluetooth, 5G NR, mmWave, etc.

FIG. 2 shows an internal configuration of a wireless communication device 106 according to some aspects, which may include antenna system 202, radio frequency (RF) transceiver 204, baseband modem 206 (including digital signal processor 208 and protocol controller 210), application processor 212, and memory 214. Although not explicitly shown in FIG. 2, in some aspects the wireless communication device may include one or more additional hardware and/or software components, such as processors/microprocessors, controllers/microcontrollers, other specialty or generic hardware/processors/circuits, peripheral device(s), memory, power supply, external device interface(s), subscriber identity module(s) (SIMs), user input/output devices (display(s), keypad(s), touchscreen(s), speaker(s), external button(s), camera(s), microphone(s), etc.), or other related components. The terminal device may include a proximity sensor, which is not shown herein, the proximity sensor may be configured to detect a proximity of a human user to the device. The proximity sensor may be arranged close to one or more transmit antennas, such that the detected proximity of the human user closely corresponds to a proximity of the human user to the one or more transmit antennas.

The wireless communication device 106 may transmit and receive radio signals on one or more radio access networks. Baseband modem 206 may direct such communication functionality of terminal device 102 according to the communication protocols associated with each radio access network, and may execute control over antenna system 202 and RF transceiver 204 to transmit and receive radio signals according to the formatting and scheduling parameters defined by each communication protocol.

The wireless communication device 106 may transmit and receive wireless signals with antenna system 202, which may be a single antenna or an antenna array that includes multiple antennas. In the transmit (TX) path, RF transceiver 204 may receive digital baseband samples from baseband modem 206 and perform analog and digital RF front-end processing on the digital baseband samples to produce analog radio frequency signals to provide to antenna system 202 for wireless transmission. RF transceiver 204 may thus include analog and digital transmission components including amplifiers (e.g., Power Amplifiers (PAs), filters, RF modulators (e.g., RF IQ modulators), and digital-to-analog converters (DACs), which RF transceiver 204 may utilize to mix the digital baseband samples received from baseband modem 206 and produce the analog radio frequency signals for wireless transmission by antenna system 202. In some aspects baseband modem 206 may control the radio transmission and reception of RF transceiver 204, including specifying the transmit and receive radio frequencies for operation of RF transceiver 204.

As shown in FIG. 2, baseband modem 206 may include digital signal processor 208, which may perform physical layer (PHY, Layer 1) transmission and reception processing to, in the transmit path, prepare outgoing transmit data provided by protocol controller 210 for transmission via RF transceiver 204, and, in the receive path, prepare incoming received data provided by RF transceiver 204 for processing by protocol controller 210. Digital signal processor 208 may be configured to perform power control and weighting.

The wireless communication device 106 may also include application processor 212 and memory 214. Application processor 212 may be a CPU, and may be configured to handle the layers above the protocol stack, including the transport and application layers. Application processor 212 may be configured to execute various applications and/or programs of terminal device 102 at an application layer of terminal device 102, such as an operating system (OS), a user interface (UI) for supporting user interaction with terminal device 102, and/or various user applications. The application processor may interface with baseband modem 206 and act as a source (in the transmit path) and a sink (in the receive path) for user data, such as voice data, audio/video/image data, messaging data, application data, basic Internet/web access data, etc. In the transmit path, protocol controller 210 may therefore receive and process outgoing data provided by application processor 212 according to the layer-specific functions of the protocol stack, and provide the resulting data to digital signal processor 208. Digital signal processor 208 may then perform physical layer processing on the received data to produce digital baseband samples, which digital signal processor may provide to RF transceiver 204. RF transceiver 204 may then process the digital baseband samples to convert the digital baseband samples to analog RF signals, which RF transceiver 204 may wirelessly transmit via antenna system 202.

Memory 214 may embody a memory component of terminal device 102, such as a hard drive or another such permanent memory device. Although not explicitly depicted in FIG. 2, the various other components of terminal device 102 shown in FIG. 2 may additionally each include integrated permanent and non-permanent memory components, such as for storing software program code, buffering data, etc.

As described above, conventional averaging-based procedures for human exposure compliance require significant memory and may be subject to an overshoot problem, in which the arithmetic mean (e.g. the average) of the emitted power exceeds the maximum power threshold, despite the power output having been reduced to preclude reaching or exceeding the upper threshold. Moreover, calculating the arithmetic mean is associated with significant memory requirements. With respect to memory resources, devices generally have access to a finite amount of memory. Conventional averaging techniques for human exposure management may require a large number of data samples, each of which must be stored in a memory for processing and/or repeated averaging. It may be desirable to select a central tendency and/or averaging technique that requires fewer demands of the memory and/or the one or more processors compared to conventional methods.

With respect to the overshoot problem, this may be a function of the nature of averages. To explain this phenomenon, it is assumed that a device may be permitted to emit an average power output up to a predetermined threshold and that the device's maximum transmission power can (but in most cases may not, e.g. not be permitted to) exceed this predetermined threshold. If a period of average power transmission includes a period of low power or zero power, several power samples of a higher transmission power (e.g. high power or even maximum power) may be required before the average power reaches the predetermined threshold. Once this predetermined threshold is reached, the device may begin transmitting at a lower power, with the aim of decreasing the average power output. However, as additional power samples are included, the relative value of the zero power samples or low power samples is diminished, and the resulting average can momentarily rise above the threshold value before it begins to be reduced by recent low power values. It may be desirable to select a central tendency calculation operation that reduces or eliminates this overshoot problem.

The presented enhanced procedure solves these issues while ensuring the above conditions. The principles and methods disclosed herein include a procedure to select transmit antenna power using a central tendency of previous output powers. According to an aspect of the disclosure, the central tendency can be the arithmetic mean of the previous output powers. According to other aspects of the disclosure, the central tendency may include a weighted arithmetic mean, a geometric mean, or a harmonic mean. For the remainder of this disclosure, a version of the arithmetic mean will be discussed.

The principles disclosed herein may provide at least the following advantages: this feature or procedure can be incorporated in wireless products e.g. cellular modem, Wi-Fi modules that are embedded inside hosts/devices; they can improve product performance and network capacity efficiency; and they can reduce cost by eliminating the need for a proximity sensor.

The procedures describes herein and devices therefor may use a central tendency (e.g. an arithmetic mean) to calculate the average power of a device during a given averaging time Ta. The mean may be calculated each Tr period defining the resolution or the granularity.

Two levels of maximum power may be enforced by the procedure, according to the upper and lower power thresholds. The maximum power level in Dynamic Power Reduction (DPR) state may be noted DPR_ON and in the non-DPR state may be noted DPR_OFF.

Arithmetic Averaging Implementation

The conventional arithmetic averaging for transmission power may be calculated as follows:

$$Avg = \frac{1}{N}\sum_{i=1}^{N} \text{Power}_i; \quad (1)$$

wherein N is the number of power samples Power$_i$ during the averaging period. Generally, the number of samples is significant and therefore the size of memory needed to perform this operation may exceed the available memory implementation size in the chipset. For example, if the resolution period is 100 ms, and the averaging window is 100 s, then 1001 samples are needed every 100 ms. To solve this issue, the following mathematical relationship may be established between the latest average called Avg$_{recent}$ and the previous average called Avg$_{previous}$:

$$Avg_{recent} = Avg_{previous} + \text{Power}_{recent} \cdot \frac{1}{N} - \text{Power}_{first} \cdot \frac{1}{N} \quad (1)$$

Power$_{recent}$ may be the new Power sample used in the current averaging window. Power$_{first}$ may be the first Power sample used in the previous averaging window. For the same example, using the principles disclosed herein, the number of samples needed may be reduced from 1001 to 2.

According to an aspect of the disclosure, this may be understood as a sliding window. In this manner, a sampling window of a predetermined size may be selected, and the central tendency of the output power may be calculated on a sliding or revolving basis as described herein.

According to an aspect of the disclosure, the procedures disclosed herein, including but not limited to the power calculations (e.g. central tendency, average power, SAR, power density, etc.) may be performed within a baseband modem. The one or more processors may be located within the baseband modem and may be configured to perform the power calculations locally (e.g. in the baseband modem) and thus without necessitating communication with a central processor of an underlying device (e.g. a smartphone, laptop, tablet, wearable device, etc.).

According to an aspect of the disclosure, transmission power measurements and/or central tendency measurements may be stored in one or more memories of the baseband modem.

Figure 3:
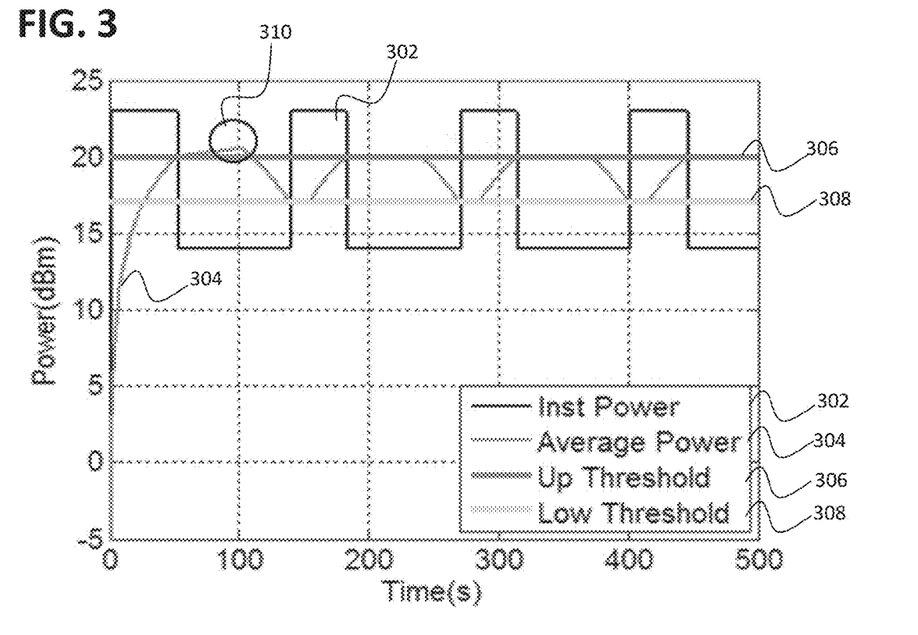
FIG. 3 depicts a simulation example of the basic arithmetic averaging procedure implementation.

FIG. 3 depicts a simulation example of the basic arithmetic averaging procedure implementation. In this figure, the instantaneous power is depicted as 302, the average power is depicted as 304, the upper power threshold (e.g. maximum permitted power) is 306, and the low power threshold (e.g. minimum power) is 308. In this figure, the power at t=−0 is 0 dBm, and at t=0, the power is increased to approximately 22.5 dBm. The average power 304 increases rapidly from 0 dBm at t=0 to 15 dBm at approximately t=20, and the average power 304 ultimately reaches the upper threshold 306 at approximately t=50. Once the average power 304 reaches the upper threshold 306 at approximately t=50, the instantaneous power is reduced (e.g. in this case, reduced from approximately 22.5 dBm to approximately 14 dBm). Although the instantaneous power 302 is reduced at approximately t=50, and although the reduced instantaneous power 302 is less than the average power 304, the average power 304 may continue to increase briefly, which can result in the average power exceeding the upper power threshold (See 310). That is, as a result of unavailable initial power records (zero) in the arithmetic averaging during power-on and reset or the transition from very low power conditions to Max Power, a potential of slight overshoots may be observed.

An optional procedure will be described according to another aspect of the disclosure.

Additional Margin Estimation

Figure 4:
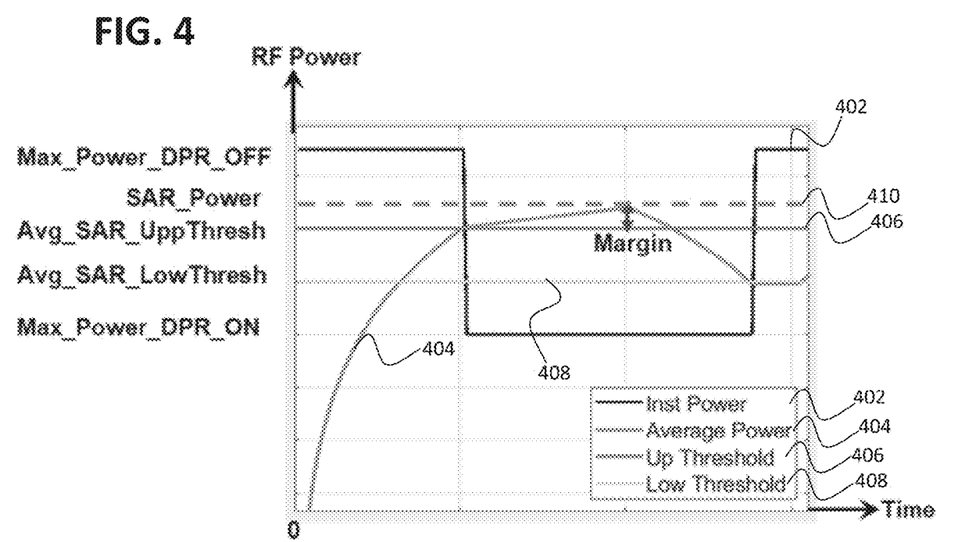
FIG. 4 depicts an optional power margin estimation.

FIG. 4 depicts an optional power margin estimation. In this figure, the instantaneous power is depicted as 402, the average power is depicted as 404, the upper power threshold is depicted as 406, and the lower power threshold is depicted as 408. To ensure that the procedure operates conservatively under these conditions, and therefore that the average power does not exceed the SAR upper power threshold (e.g. the statutory upper power threshold, the maximum permitted upper power threshold) 410, an additional power threshold and margin may be introduced, namely SAR_Power=Avg_SAR_UppThresh+Margin. In this manner, the upper power threshold 406 for purposes of reducing the instantaneous power 402 is set beneath the statutory upper power threshold 410. As shown in this figure, the average power may increase after t=0 until it reaches the upper power threshold 406 (which is reduced from the statutory upper power threshold 410 by a margin). Once the average power 404 reaches the upper power threshold 406, the instantaneous power 402 is reduced. Subsequently, the average power 404 continues to slightly increase, such that its maximum value is less than or equal to the statutory upper power threshold 406.

The following describes calculation of the margin. SAR compliance may be determined at SAR_Power according to the normally required SAR measurement procedures. Margin is the maximum variation Avg_SAR_Power is allowed to rise above Avg_SAR_UppThresh; i.e., any overshoot is limited to Margin. The value of Margin is calculated according to Avg_SAR_UppThresh (U), Maximum Power (P) and Max_Power_DPR_ON (D):

$$\text{Margin}_{dB} = 10\log_{10}\left[U + D\left(1 - \frac{U}{P}\right)\right] - U_{dB} = \qquad (2)$$

$$10\log_{10}\left[10^{\frac{U_{dB}}{10}} + 10^{\frac{D_{dB}}{10}}\left(1 - 10^{\frac{U_{dB}-P_{dB}}{10}}\right)\right] - U_{dB}$$

Figure 5:
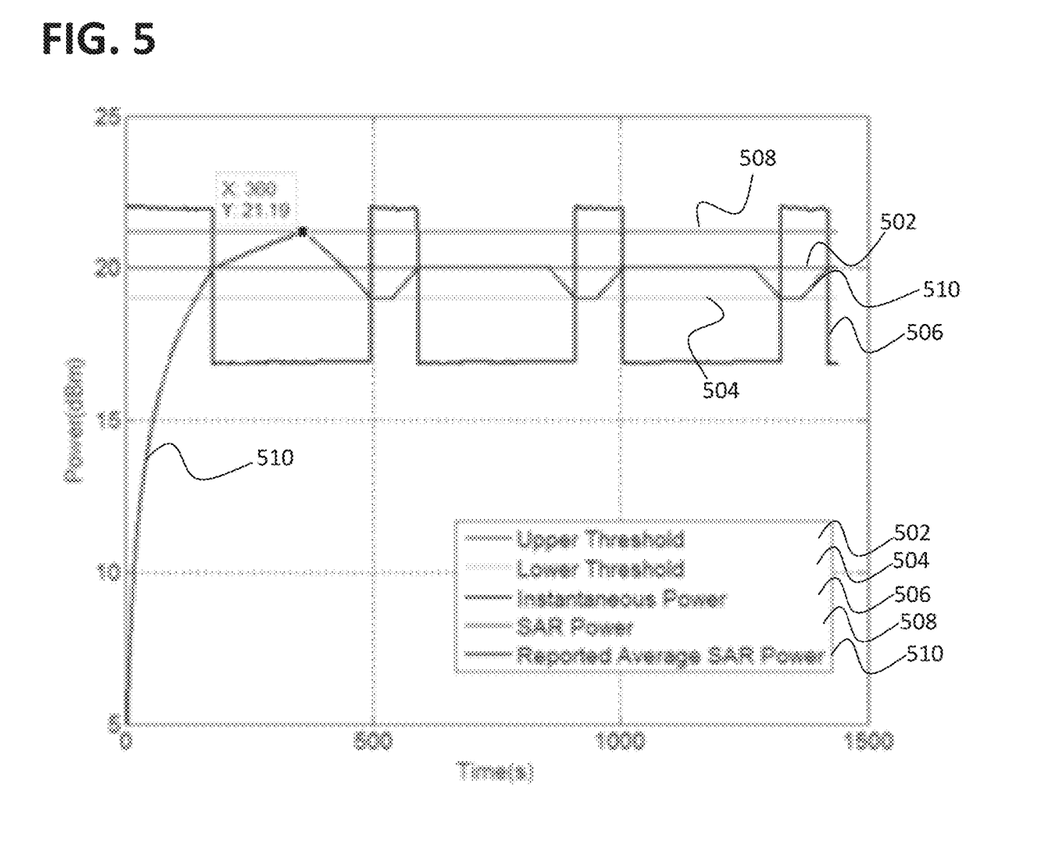
FIG. 5 depicts a specific implementation of the margin estimation of FIG. 4.

FIG. 5 depicts a specific implementation of the margin estimation of FIG. 4. In this figure, the upper threshold is depicted as 502, the lower threshold is depicted as 504, the instantaneous power is depicted as 506, the SAR power (the maximum allowable power, the maximum statutory power) is depicted as 508; and the reported average SAR power is depicted as 510. Equation (2) above has been validated by measurement where the measured margin of 1.19 dB corresponds to the calculated margin considering (U=20 dBm, P=23 dBm, D=18 dBm) as example. In this case, the procedure behaves as follows: when the average power 510 reaches the upper threshold level 502, the Dynamic Power Reduction (DPR) state is triggered and passes from the OFF state to the ON state. In this manner, the instantaneous power 506 is reduced (depicted herein as a reduction of approximately 22.5 dBm to approximately 17.5 dBm). Conversely, when the average power 510 reaches the lower threshold 504, the DPR passes from the ON state to the OFF state. In this manner, the instantaneous power 506 is increased (depicted herein as an increase from approximately 17.5 dBm to approximately 22.5 dBm). In the first cycle, the average power 510 continues to increase after reduction of the instantaneous power; however, the upper threshold 502 is selected such that the maximum average power 510 is less than or equal to the maximum permitted power (e.g. the SAR power) 508.

Figure 6:
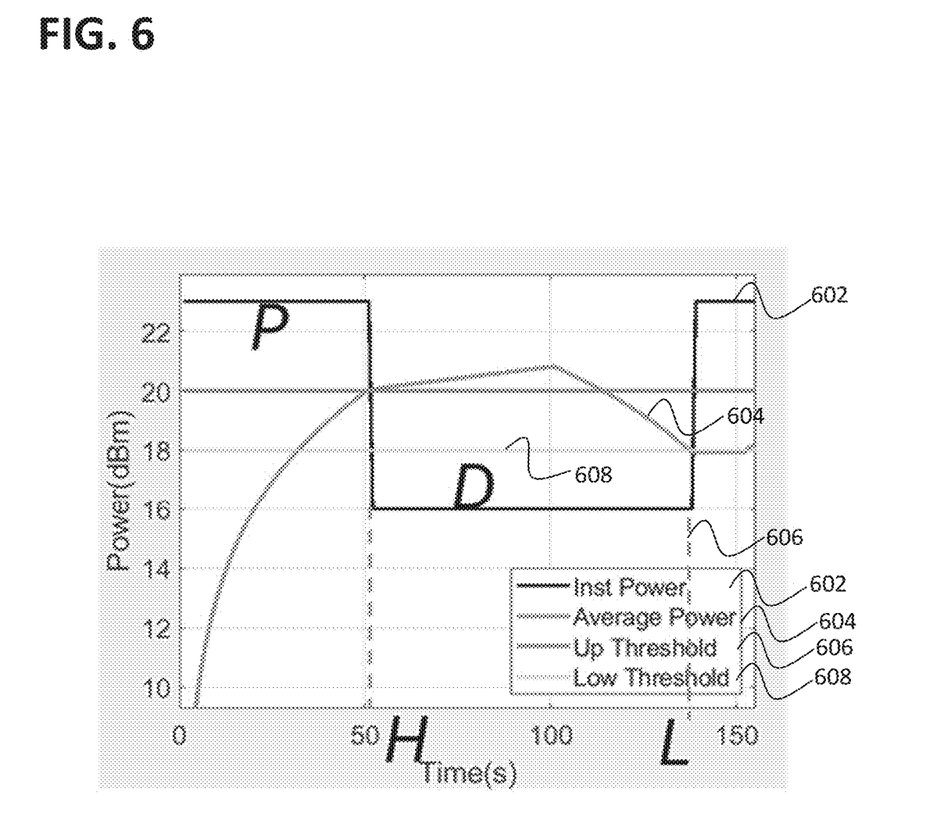
FIG. 6 depicts an optional dynamic power reduction time-based trigger.

An additional, optional procedure will be described according to another aspect of the disclosure DPR Trigger Based on Time Another method to avoid overshoot of the average power beyond an upper power threshold is by using a procedure that triggers a Lower level of maximum power after a given time even if the upper threshold is not reached. This is referred to herein as employing a DPR time-based trigger. FIG. 6 depicts an optional DPR time-based trigger, in which the instantaneous power is depicted as 602, the average power is depicted as 604, the upper threshold is depicted as 606, and the lower threshold is depicted as 608. The time interval (H*Tr): (Threshold value of H) may be calculated as follows.

The average at the first cycle may be calculated as:

$$Avg_{recent} = \frac{HP + (L - H)D}{N} = \frac{(P - D)H + LD}{N} \qquad (3)$$

The average should not exceed the upper threshold (U), such that:

$$Avg_{recent} = \frac{(P-D)H + LD}{N} < U \qquad (4)$$

$$(P-D)H + LD < U(N) \qquad (5)$$

The upper bound L<N may be calculated as:

$$(P-D)H + D(N) < U(N) \qquad (6)$$

In light of these, the following condition, if satisfied, will avoid overshooting of the upper threshold:

$$H < \frac{(U-D)(N)}{P-D} \qquad (7)$$

As such, the lower level of the maximum power should be triggered at H*Tr even if the upper threshold is not reached.

Figure 7A:
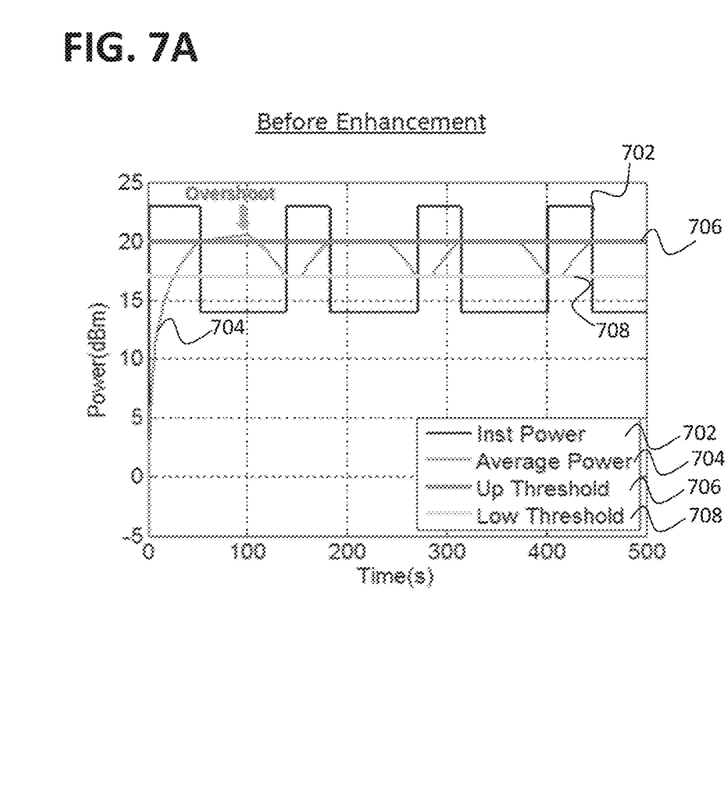
FIG. 7A depicts a conventional arithmetic averaging of power.
Figure 7B:
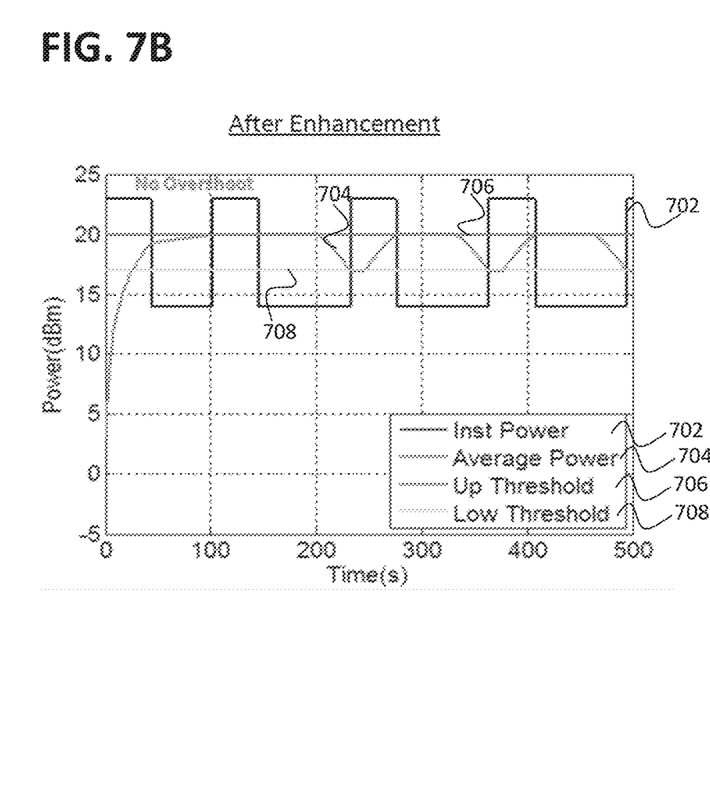
FIG. 7B depicts a modified arithmetic averaging.

FIG. 7A depicts a conventional arithmetic averaging of power, and FIG. 7B depicts a modified arithmetic averaging using the principles described herein, which prevents an overshooting of the upper power threshold. In these figures, instantaneous power is depicted as 702, average power is depicted as 704, the upper threshold is depicted as 706, and the lower threshold is depicted as 708.

In this case, the procedure behaves as follows: If the Requested Power is below the DPR_ON value, the DPR_ON state is maintained. If Requested Power is above DPR_ON and Avg Power is equal or below lower Threshold, the DPR_OFF state is triggered during a fixed time H*Tr (see the above calculations (3)-(7)).

Figure 8:
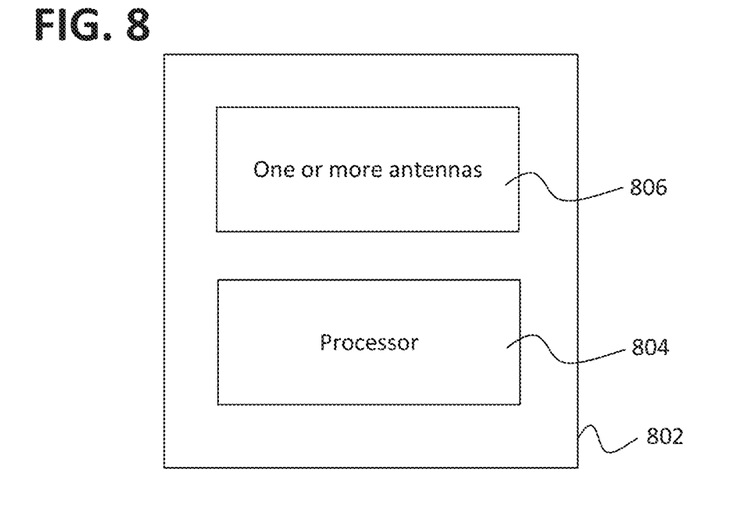
FIG. 8 depicts a wireless communication device.
Figure 9:
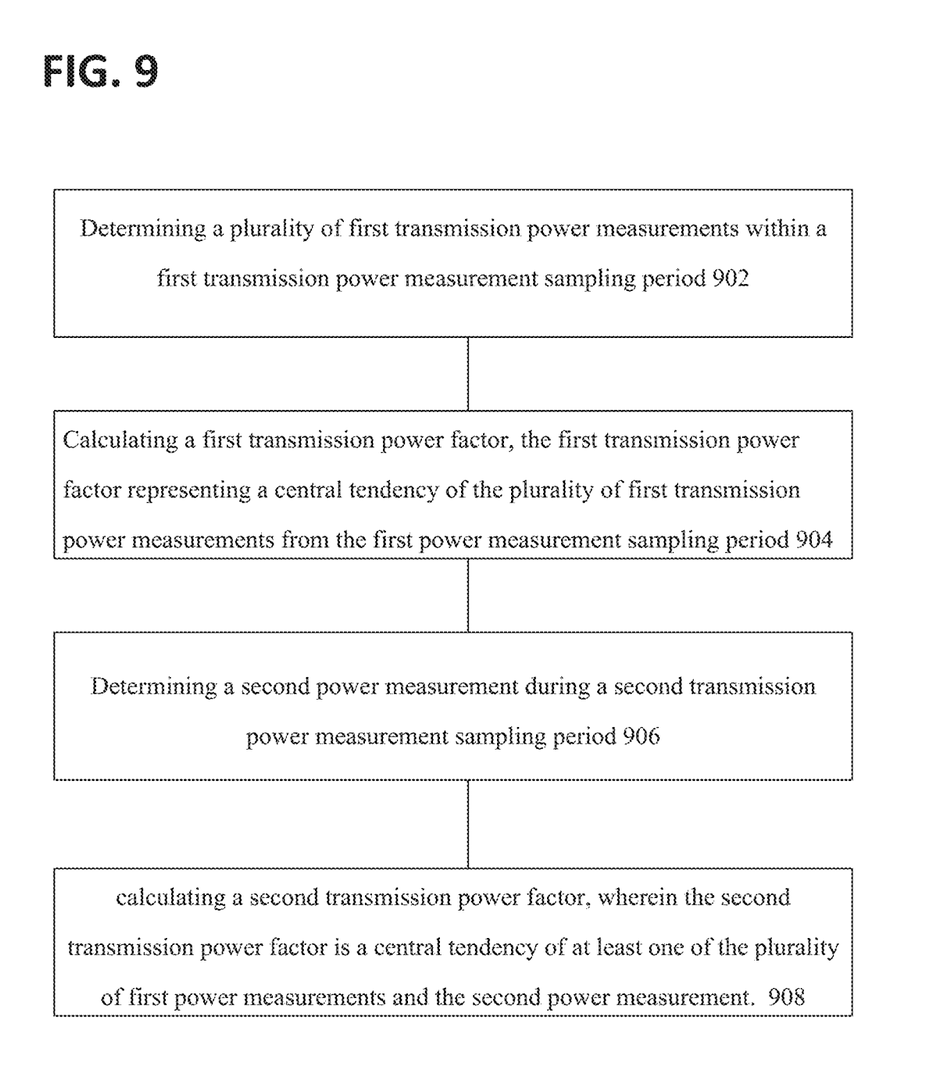
FIG. 9 depicts a method of power management.

FIG. 8 depicts a wireless communication device 802, including a processor 804, configured to determine one or more first transmission power measurements within a first transmission power measurement sampling period; calculate a first transmission power factor, the first transmission power factor representing a central tendency of the one or more first transmission power measurements from the first power measurement sampling period; determine a second power measurement during a second transmission power measurement sampling period; and calculate a second transmission power factor, wherein the second transmission power factor is a central tendency of at least one of the one or more first power measurements and the second power measurement. The wireless communication device may optionally include one or more antennas 806. In combination with any of one or more other features of this paragraph, the central tendency may optionally be a statistical average. Alone or in combination with any of one or more other features of this paragraph, the second transmission power factor may optionally be a central tendency of the first transmission power factor and the second power measurement, less a first power measurement of the plurality of first power measurements. Alone or in combination with any of one or more other features of this paragraph, the processor may be further configured to compare the second power factor to a predetermined power factor region, wherein if the second power factor is within the power factor region, the one or more processors are configured to operate the wireless communication device according to a first operational mode, and if the second power factor is outside of the power factor region, the one or more processors are configured to operate the wireless communication device according to a second operational mode. Alone or in combination with any of one or more other features of this paragraph, the first operational mode may optionally include controlling a baseband modem and/or a transceiver to transmit at a first power level; and wherein the second operational mode includes controlling the baseband modem and/or the transceiver to transmit at a second power level; wherein the first power level is greater than the second power level. Alone or in combination with any of one or more other features of this paragraph, an upper value of the power factor region may be calculated as $$= 10\log_{10}\left[U + D\left(1 - \frac{U}{P}\right)\right] - U_{dB} =$$

$$10\log_{10}\left[10^{\frac{U_{dB}}{10}} + 10^{\frac{D_{dB}}{10}}\left(1 - 10^{\frac{U_{dB}-P_{dB}}{10}}\right)\right] - U_{dB}$$

wherein U is a target upper threshold, P is a maximum transmit power of the wireless communication device in the first operational mode; and D is a maximum transmit power of the wireless communication device in the second operational mode. Alone or in combination with any of one or more other features of this paragraph, the wireless communication device may optionally include a maximum power transmission duration, wherein the one or more processors are further configured to switch from the first operational mode to the second operational mode if a duration of transmission in the first operational mode exceeds the maximum power transmission duration. Alone or in combination with any of one or more other features of this paragraph, the second transmission power measurement sampling period may include at least one power measurement subsequent to and not included in the first transmission power measurement sampling period. Alone or in combination with any of one or more other features of this paragraph, the wireless communication device may be configured as a smartphone, a laptop, a wearable device (e.g. wearables), or an Internet-of-Things device. Alone or in combination with any of one or more other features of this paragraph, the wireless communication device may be configured as a wireless router. FIG. 9 depicts a method of power management, including determining a plurality of first transmission power measurements within a first transmission power measurement sampling period 902; calculating a first transmission power factor, the first transmission power factor representing a central tendency of the plurality of first transmission power measurements from the first power measurement sampling period 904; determining a second power measurement during a second transmission power measurement sampling period 906; and calculating a second transmission power factor, wherein the second transmission power factor is a central tendency of at least one of the plurality of first power measurements and the second power measurement 908.

The wireless communication device may include one or more processors, which may be configured to perform any of the data calculations disclosed herein. The one or more processors may be configured to control one or more proximity sensors to detect a proximity of a user, and the one or more processors may be configured to implement a human exposure compliance strategy. The wireless communication device may be configured to implement the human exposure compliance strategy without respect to any detection by a proximity sensor, or based, at least in part, on a proximity sensor detecting that a human user is within a predetermined threshold of the wireless communication device.

The one or more processors may be configured to perform any of the human exposure management strategies disclosed herein. The one or more processors may be configured to switch between a first operational mode and a second operational mode, depending on any results of the human exposure management strategy or strategies performed. For example, the first operational mode may include the one or more processors controlling a baseband modem and/or a transceiver to transmit a wireless signal at a first power lever, and the second operational mode may include the one or more processors controlling the baseband modem and/or a transceiver to transmit a wireless signal at a second power lever, wherein the first power level is greater than the second power level. The one or more processors may control the baseband modem and/or the transceiver by sending one or more signals representing an instruction to transmit according to the first power level or the second power level. The one or more processors as described herein may be one or more processors within the transceiver, one or more processors within the baseband modem, and/or one or more processors external or the transceiver and the baseband modem.

According to an aspect of the disclosure, any procedures for power management disclosed herein as using the term "average" can be alternatively understood as referring to a central tendency and may include calculating a mean (e.g. a statistical average), a weighted arithmetic mean, a geometric mean, or a harmonic mean.

According to an aspect of the disclosure, the wireless communication device disclosed herein may be configured at least as a smartphone, a laptop, a wearable device (e.g. wearables), or Internet-of-Things device.

Further aspects of the disclosure will be describe by way of example.

In Example 1, a wireless communication device, including one or more antennas; and one or more processors, configured to determine one or more first transmission power measurements within a first transmission power measurement sampling period; calculate a first transmission power factor, the first transmission power factor representing a central tendency of the one or more first transmission power measurements from the first power measurement sampling period; determine a second power measurement during a second transmission power measurement sampling period; and calculate a second transmission power factor, wherein the second transmission power factor is a central tendency of at least one of the one or more first power measurements and the second power measurement.

In Example 2, the wireless communication device of Example 1, wherein the central tendency is a statistical average.

In Example 3, the wireless communication device of Example 1 or 2, wherein the second transmission power factor is a central tendency of the first transmission power factor and the second power measurement, less a first power measurement of the plurality of first power measurements.

In Example 4, the wireless communication device of any one of Examples 1 to 3, further including comparing the second power factor to a predetermined power factor region, wherein if the second power factor is within the power factor region, the one or more processors are configured to operate the wireless communication device according to a first operational mode, and if the second power factor is outside of the power factor region, the one or more processors are configured to operate the wireless communication device according to a second operational mode.

In Example 5, the wireless communication device of Example 4, wherein the first operational mode includes controlling a baseband modem and/or a transceiver to transmit at a first power level; and wherein the second operational mode includes controlling the baseband modem and/or the transceiver to transmit at a second power level; wherein the first power level is greater than the second power level.

In Example 6, the wireless communication device of Example 4 or 5, wherein an upper value of the power factor region is calculated as $$= 10 \log_{10}\left[U + D\left(1 - \frac{U}{P}\right)\right] - U_{dB} =$$
$$10 \log_{10}\left[10^{\frac{U_{dB}}{10}} + 10^{\frac{D_{dB}}{10}}\left(1 - 10^{\frac{U_{dB}-P_{dB}}{10}}\right)\right] - U_{dB}$$

wherein U is a target upper threshold, P is a maximum transmit power of the wireless communication device in the first operational mode; and D is a maximum transmit power of the wireless communication device in the second operational mode.

In Example 7, the wireless communication device of any one of Examples 1 to 6, further including a maximum power transmission duration, wherein the one or more processors are further configured to switch from the first operational mode to the second operational mode if a duration of transmission in the first operational mode exceeds the maximum power transmission duration.

In Example 8, the wireless communication device of any one of Examples 1 to 7, wherein the second transmission power measurement sampling period includes at least one power measurement subsequent to and not included in the first transmission power measurement sampling period.

In Example 9, the wireless communication device of any one of Examples 1 to 8, wherein the wireless communication device is configured as a smartphone, a laptop, a wearable device (e.g. wearables), or an Internet-of-Things device.

In Example 10, the wireless communication device of any one of Examples 1 to 8, wherein the wireless communication device is configured as a wireless router.

In Example 11, a method of power management, including determining a plurality of first transmission power measurements within a first transmission power measurement sampling period; calculating a first transmission power factor, the first transmission power factor representing a central tendency of the plurality of first transmission power measurements from the first power measurement sampling period; determining a second power measurement during a second transmission power measurement sampling period; and calculating a second transmission power factor, wherein the second transmission power factor is a central tendency of at least one of the plurality of first power measurements and the second power measurement.

In Example 12, the method of power management of Example 11, wherein the central tendency is a statistical average.

In Example 13, the method of power management of Example 11 or 12, wherein the second transmission power factor is a central tendency of the first transmission power factor and the second power measurement, less a first power measurement of the plurality of first power measurements.

In Example 14, the method of power management of any one of Examples 11 to 13, further including comparing the second power factor to a predetermined power factor region; and if the second power factor is within the power factor region, operating the wireless communication device according to a first operational mode; and if the second power factor is outside of the power factor region, operating the wireless communication device according to a second operational mode.

In Example 15, the method of power management of Example 14, wherein the first operational mode includes transmitting at a first power level; and wherein the second operational mode includes transmitting at a second power level; wherein the first power level is greater than the second power level.

In Example 16, the method of power management of Example 14 or 15, wherein an upper value of the power factor region is calculated as $$= 10\log_{10}\left[U + D\left(1 - \frac{U}{P}\right)\right] - U_{dB} =$$

$$10\log_{10}\left[10^{\frac{U_{dB}}{10}} + 10^{\frac{D_{dB}}{10}}\left(1 - 10^{\frac{U_{dB}-P_{dB}}{10}}\right)\right] - U_{dB}$$

wherein U is a target upper threshold, P is a maximum transmit power of the wireless communication device in the first operational mode; and D is a maximum transmit power of the wireless communication device in the second operational mode.

In Example 17, the method of power management of any one of Examples 11 to 16, further including switching from the first operational mode to the second operational mode if a duration of transmission in the first operational mode exceeds a maximum power transmission duration.

In Example 18, the wireless communication device of any one of Examples 11 to 17, wherein the second transmission power measurement sampling period includes at least one power measurement subsequent to and not included in the first transmission power measurement sampling period.

In Example 19, the non-transitory computer readable medium, including instructions which, if executed, cause one or more processors to perform the method of any of Examples 11 to 18.

What is claimed is:

1. A wireless communication device, comprising
one or more processors, configured to:
determine a plurality of first transmission power measurements within a first transmission power measurement sampling period;
calculate a first transmission power factor, the first transmission power factor representing a central tendency of the plurality of first transmission power measurements from the first power measurement sampling period;
determine a second power measurement during a second transmission power measurement sampling period; and
calculate a second transmission power factor, wherein the second transmission power factor is a central tendency of at least one of the plurality of first power measurements and the second power measurement;
wherein the second transmission power factor is a central tendency of the first transmission power factor and the second power measurement, less a first power measurement of the plurality of first power measurements.

2. The wireless communication device of claim 1, wherein the central tendency is a statistical average.

3. The wireless communication device of claim 1, further comprising comparing the second power factor to a predetermined power factor region, wherein if the second power factor is within the predetermined power factor region, the one or more processors are configured to operate the wireless communication device according to a first operational mode, and if the second power factor is outside of the predetermined power factor region, the one or more processors are configured to operate the wireless communication device according to a second operational mode.

4. The wireless communication device of claim 3, wherein the first operational mode comprises controlling a baseband modem and/or a transceiver to transmit at a first power level; and wherein the second operational mode comprises controlling the baseband modem and/or the transceiver to transmit at a second power level; wherein the first power level is greater than the second power level.

5. The wireless communication device of claim 4, wherein an upper value of the predetermined power factor region is calculated as $$= 10\log_{10}\left[U + D\left(1 - \frac{U}{P}\right)\right] - U_{dB} =$$

$$10\log_{10}\left[10^{\frac{U_{dB}}{10}} + 10^{\frac{D_{dB}}{10}}\left(1 - 10^{\frac{U_{dB}-P_{dB}}{10}}\right)\right] - U_{dB}$$

wherein U is a target upper threshold, P is a maximum transmit power of the wireless communication device in the first operational mode; and D is a maximum transmit power of the wireless communication device in the second operational mode.

6. The wireless communication device of claim 3, further comprising a maximum power transmission duration, wherein the one or more processors are further configured to switch from the first operational mode to the second operational mode if a duration of transmission in the first operational mode exceeds the maximum power transmission duration.

7. The wireless communication device of claim 1, wherein the second transmission power measurement sampling period includes at least one power measurement subsequent to and not included in the first transmission power measurement sampling period.

8. The wireless communication device of claim 1, wherein the wireless communication device is configured as a smartphone, a laptop, a wearable device (e.g. wearables), or an Internet-of-Things device.

9. The wireless communication device of claim 1, wherein the wireless communication device is configured as a wireless router.

10. A method of power management, comprising
determining a plurality of first transmission power measurements within a first transmission power measurement sampling period;
calculating a first transmission power factor, the first transmission power factor representing a central tendency of the plurality of first transmission power measurements from the first power measurement sampling period;
determining a second power measurement during a second transmission power measurement sampling period; and
calculating a second transmission power factor, wherein the second transmission power factor is a central tendency of at least one of the plurality of first power measurements and the second power measurement;
wherein the second transmission power factor is a central tendency of the first transmission power factor and the second power measurement, less a first power measurement of the plurality of first power measurements.

11. The method of power management of claim 10, wherein the central tendency is a statistical average.

12. The method of power management of claim 10, further comprising comparing the second power factor to a predetermined power factor region; and if the second power factor is within the predetermined power factor region, operating the wireless communication device according to a first operational mode; and if the second power factor is outside of the predetermined power factor region, operating the wireless communication device according to a second operational mode.

13. The method of power management of claim 12, wherein the first operational mode comprises transmitting at a first power level; and wherein the second operational mode comprises transmitting at a second power level; wherein the first power level is greater than the second power level.

14. The method of power management of claim 12, wherein an upper value of the predetermined power factor region is calculated as $$= 10\log_{10}\left[U + D\left(1 - \frac{U}{P}\right)\right] - U_{dB} =$$

$$10\log_{10}\left[10^{\frac{U_{dB}}{10}} + 10^{\frac{D_{dB}}{10}}\left(1 - 10^{\frac{U_{dB}-P_{dB}}{10}}\right)\right] - U_{dB}$$

wherein U is a target upper threshold, P is a maximum transmit power of the wireless communication device in the first operational mode; and D is a maximum transmit power of the wireless communication device in the second operational mode.

15. The method of power management of claim 12, further comprising switching from the first operational mode to the second operational mode if a duration of transmission in the first operational mode exceeds a maximum power transmission duration.

16. The wireless communication device of claim 10, wherein the second transmission power measurement sampling period includes at least one power measurement subsequent to and not included in the first transmission power measurement sampling period.

17. A non-transitory computer readable medium, including instructions which, if executed, cause one or more processors to:
    determine one or more first transmission power measurements within a first transmission power measurement sampling period;
    calculate a first transmission power factor, the first transmission power factor representing a central tendency of the one or more first transmission power measurements from the first power measurement sampling period;
    determine a second power measurement during a second transmission power measurement sampling period; and
    calculate a second transmission power factor, wherein the second transmission power factor is a central tendency of at least one of the one or more first power measurements and the second power measurement;
    wherein the second transmission power factor is a central tendency of the first transmission power factor and the second power measurement, less a first power measurement of the plurality of first power measurements.

18. The non-transitory computer readable medium of claim 17, wherein the central tendency is a statistical average.

* * * * *

UNITED STATES PATENT AND TRADEMARK OFFICE
CERTIFICATE OF CORRECTION

PATENT NO. : 12,069,581 B2  
APPLICATION NO. : 17/353843  
DATED : August 20, 2024  
INVENTOR(S) : Walid El Hajj et al.

Page 1 of 1

It is certified that error appears in the above-identified patent and that said Letters Patent is hereby corrected as shown below:

On the Title Page

Item (30) Foreign Application Priority Data  
Please add --Sept. 23, 2020 (IN) 202041041295--

Signed and Sealed this  
Twenty-fifth Day of February, 2025

Coke Morgan Stewart  
*Acting Director of the United States Patent and Trademark Office*